United States Patent [19]

Lepp

[11] 4,241,988

[45] Dec. 30, 1980

[54] CAMERA SUPPORT BRACKET

[76] Inventor: George D. Lepp, 3015 Grinnel Pl., Davis, Calif. 95616

[21] Appl. No.: 35,273

[22] Filed: May 1, 1979

[51] Int. Cl.³ .................... G03B 17/00; F16M 11/12
[52] U.S. Cl. .................................... 354/293; 248/183
[58] Field of Search .............. 248/179, 183; 354/81, 354/145, 290, 293, 295, 126, 136; 352/243

[56] References Cited

U.S. PATENT DOCUMENTS

| | | | |
|---|---|---|---|
| 2,560,200 | 7/1951 | Werzyn | 248/183 X |
| 2,599,269 | 6/1952 | Markle | 354/126 X |
| 3,738,248 | 6/1973 | Fish et al. | 354/126 X |
| 3,970,835 | 7/1976 | Crete | 354/290 X |

FOREIGN PATENT DOCUMENTS 420855 3/1967 Switzerland ........................... 354/293

*Primary Examiner*—Donald A. Griffin
*Attorney, Agent, or Firm*—Edward E. Roberts

[57] ABSTRACT

There is shown and described a bracket for supporting cameras and electronic flash units in an ideal arrangement for high quality photographic techniques. The bracket includes a member for supporting a camera, a pair of members for supporting electronic flash units, clamps for joining the several members together and appropriate threaded knobs and screw members for adjusting the bracket arrangement as well as mounting the electronic flash units and the camera thereon.

7 Claims, 4 Drawing Figures

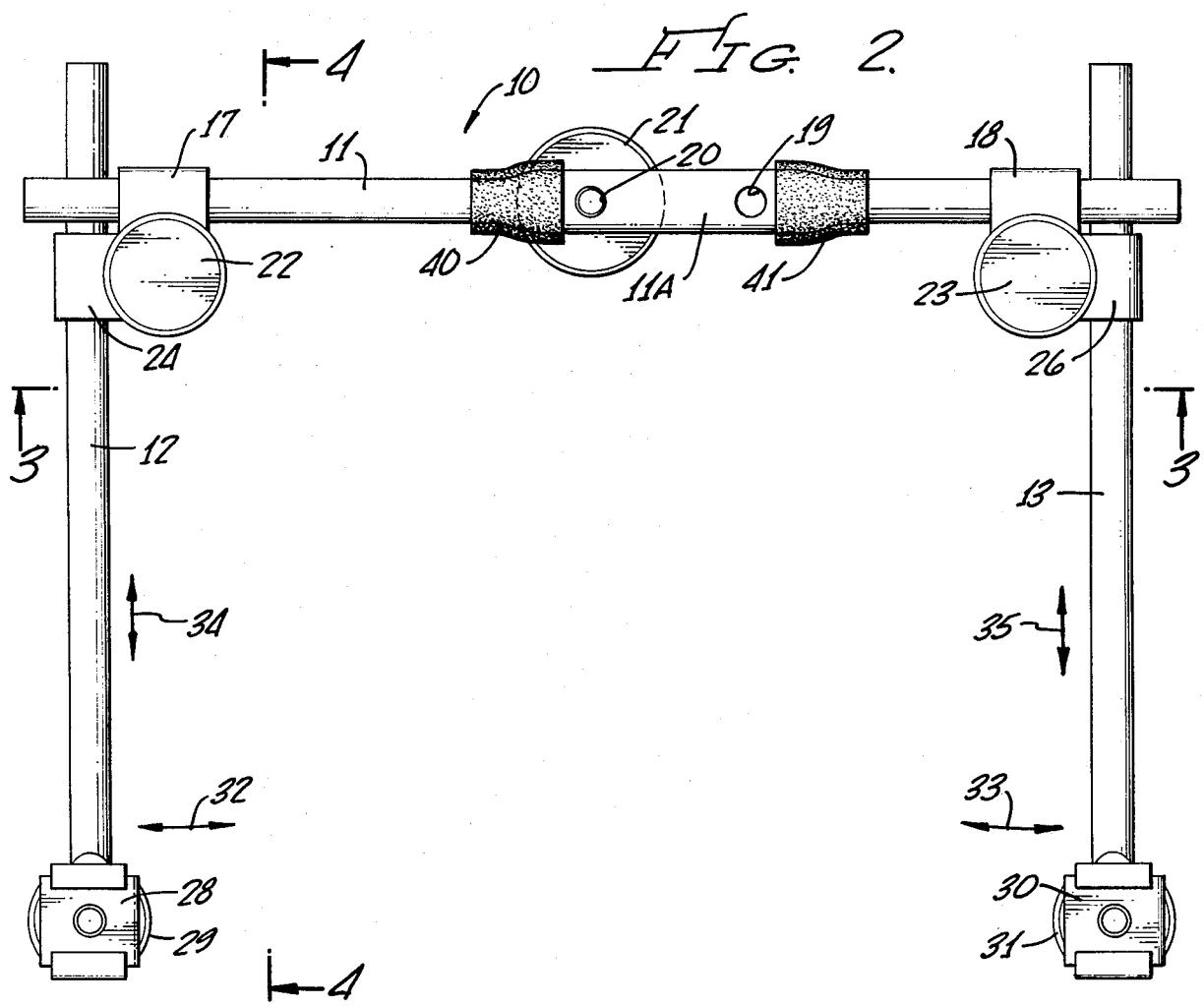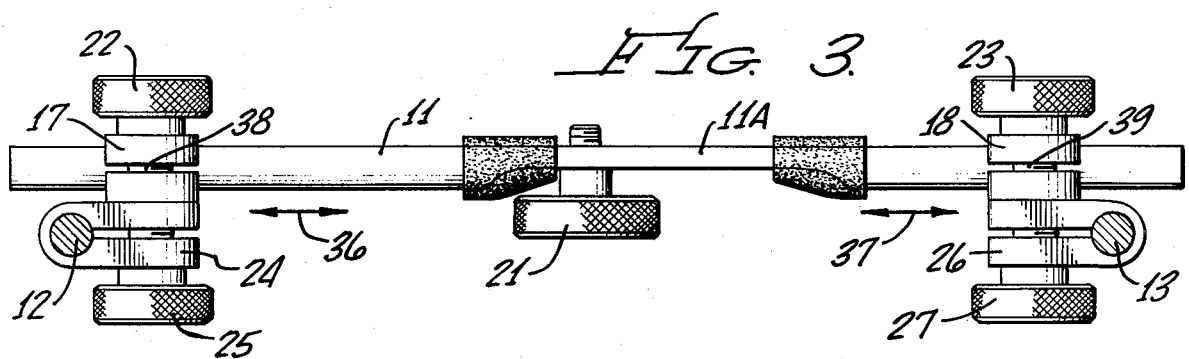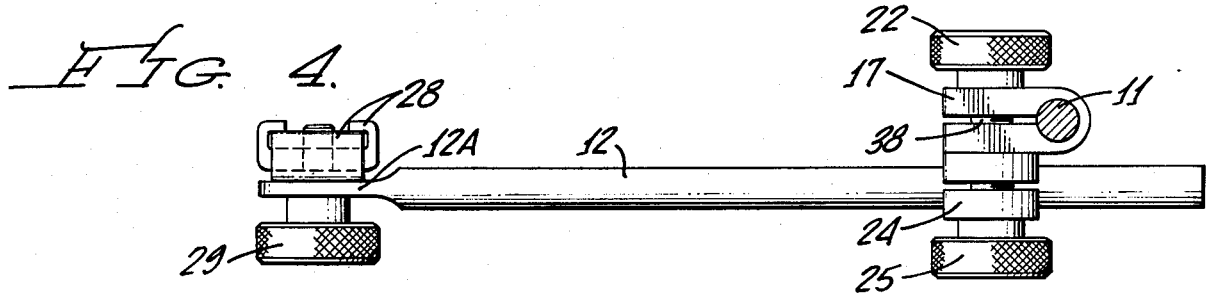

CAMERA SUPPORT BRACKET

BACKGROUND OF THE INVENTION

1. Field of the Invention

This invention is related to photographic accessory equipment, in general, and to a bracket for supporting electronic flash units in a desirable position relative to a camera, in particular.

2. Prior Art

There are many known arrangements for coordinating and/or synchronizing electronic flash units with the shutter of a camera. In some instances, the flash unit is mounted directly on the camera making the camera unwieldy to handle and, as well, causing unnatural lighting from the flash unit.

In other instances, the flash units are located remotely from the camera. However, this arrangement generally requires a large amount of equipment and, frequently, complex arrangements such as strobe lights or the like which are synchronized with the camera. Moreover, in these instances the flash units are frequently spaced relatively far from the camera thereby providing other problems in terms of the lighting effect.

PRIOR ART

To date, search results have not been obtained and applicant is unaware of any pertinent prior art.

SUMMARY OF THE INVENTION

There is shown and described a bracket for supporting a camera and, as well, electronic flash units. The flash units are supported in close proximity to the camera and to the subject. The bracket includes a camera supporting rod and a pair of electronic flash supporting rods. The flash supporting rods are joined to the camera supporting rod by appropriate clamps which are controlled by clamp arrangements, such that positioning of the respective rods is easily achieved. Various camera mounting and positioning elements are also provided.

DESCRIPTION OF THE DRAWING

FIG. 2 is a top view of the bracket that forms the instant invention.

FIG. 3 is an end view of the bracket taken along the lines 3—3 in FIG. 2.

FIG. 4 is an end view of one of the flash mounting rods taken along the lines 4—4 in FIG. 2.

DESCRIPTION OF THE PREFERRED EMBODIMENT

Figure 1:
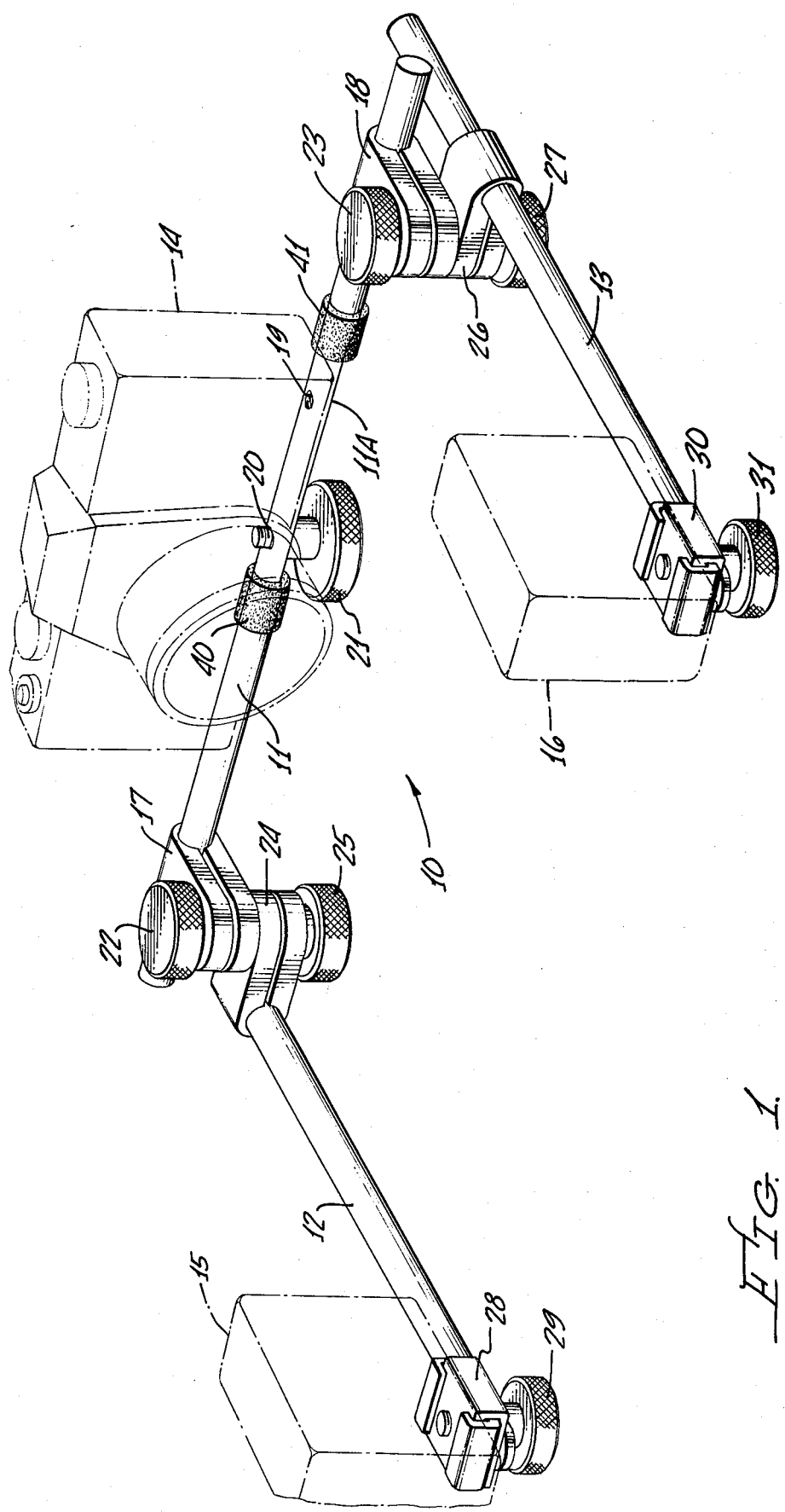
FIG. 1 is a perspective view of the bracket with camera and electronic flash units shown mounted thereon.

Referring now to FIG. 1, there is shown a perspective view of the bracket which forms the instant invention. Bracket 10 includes camera mounting rod 11 and flash unit supporting rods 12 and 13. Camera 14 as well as flash units 15 and 16 are shown in dashed outline to represent units attached to bracket 10. Camera mounting bracket 11 includes a centrally disposed flattened area 11a at which area the camera 14 is disposed. A pair of threaded apertures 19 and 20 pass through the flattened area 11a. The apertures are intended to receive a threaded end of thumb screw 21. In the embodiment shown, screw 21 has a knurled end for ease of operation. The inner, threaded end is adapted to pass through aperture 19 or 20 and to be threadedly engagable with camera 14. Thus, when camera 14 is disposed adjacent to rod 11 at location 11a, screw 21 is appropriately turned and threadedly engaged with a receptable in camera 14. Thus, camera 14 is securely engaged with rod 11. The outer ends of rod 11 are substantially cylindrical in configuration. The ends of rod 11 pass through apertures in clamps 17 and 18, respectively. An elongated screw member or threaded rod passes through an aperture in clamp 17 and is engaged by threaded nut 22. Similarly, a threaded rod passes through an aperture in clamp 18 and is engaged by knurled nut 23.

The threaded rod that passes through clamp 17 likewise passes through an aperture in clamp 24 and is engaged at the other end by a threaded, knurled nut 25. Rod 12 passes through the clamping aperture in clamp 24. By selectively loosening and/or tightening knurled nuts 22 and 25, clamps 17 and 24 are respectively tightened and clamped on rod 11 and 12, respectively. Thus, the respective ends of rods 11 and 12 can be moved forward or backward (in and out) relative to clamps 17 and 24. In addition, with the selective loosening and tightening of nuts 22 and 25, rods 11 and 12 can be rotated about the threaded rod and arranged to form an acute or an obtuse angle relative to each other.

A similar arrangement is disposed at the opposite end of rod 11 wherein clamp 18 and knurled nut 23 are clamped on rod 11 and, as well, clamp 26 and knurled nut 27 are selectively clamped on the end of flash unit mounting rod 13. Again, rods 11 and 13 can be adjusted relative to each other both angularly and linearly.

At the outer end of rod 12 there is disposed an electronic flash shoe of relatively typical configuration. Flash shoe 28 is mounted to the flattened end of rod 12 by means of a knurled screw 29. By selectively loosening or tightening screw 29, electronic flash shoe 28 can be loosened to receive an electronic flash unit of suitable design. Likewise, a flash shoe 30 and a controlling knurled screw 31 are disposed at the outer end of rod 13. With the apparatus disposed as suggested in FIG. 1, appropriate interconnecting wires or the like can be connected between camera 14 and flash units 15 and 16, respectively. These conductors can be wound around and engaged with the respective rods in order to provide suitable mounting and disposition thereof.

Referring now to FIG. 2 there is shown a top view of bracket 10. In this view, camera 14 and flash units 15 and 16 have been omitted for purposes of clarity. In FIG. 2, the relationship of rods 11, 12 and 13 relative to each other is best illustrated. In addition, the relationship between clamps 17, 24, 18, and 26 are indicated. Knurled nuts 22 and 23 are also shown to advantage. The configuration of electronic flash shoes 28 and 30 at the flattened outer ends of rods 12 and 13 are also shown. Arrows 32 and 33 show the relative angular motion of rods 12 and 13, respectively, when nuts 22 and 23 are appropriately loosened. In addition, arrows 34 and 35 show the relative linear motion of rods 12 and 13, respectively, when nuts 25 and 27 are loosened as well. While screw 21 is shown associated with aperture 20 in both FIGS. 1 and 2, it should be noted that screw 21 can be associated with aperture 19 if so desired.

Soft plastic sleeves 40 and 41 are shown disposed on rod 11. Typically, the sleeves are substantially cylindrical in shape and are mounted on the rod 11 prior to inserting rod 11 into clamps 17 and 18. By positioning sleeves 40 and 41 relative to shaft 11, a suitable flexible, positive camera positioning adjustment is permitted.

Referring to FIG. 3, there is shown an end view of bracket 10 taken along lines 3—3 in FIG. 2. In FIG. 3, the relatively flattened portion 11a of rod 11 is clearly demonstrated. The manner in which screw 21 passes through rod 11 at flattened area 11a is also illustrated. The relationship of clamps 17 and 24 as well as knurled nuts 22 and 25 is also depicted. As well, clamps 18 and 26 as well as knurled nuts 23 and 27 are also shown in FIG. 3. Also shown in FIG. 3 are the respective threaded rods 38 and 39 which pass through the apertures in clamps 17 and 24 as well as clamps 18 and 26, respectively. Threaded rod 38 is engage by knurled nuts 22 and 25 to selectively apply pressure to clamps 17 and 24 and therefore cause these clamps to grips rods 11 and 12, respectively. Similarly, knurled nuts 23 and 27 selectively engaged threaded rod 39 to apply pressure to clamps 18 and 26 in order to clamp rods 11 and 13, respectively. Also, in FIG. 3 the arrows 36 and 37 indicate the relative movement of the screw adjustment relative to rod 11. The mounting sleeves 40 and 41 (see FIG. 2) are included in FIG. 3 for clarity.

Referring now to FIG. 4, there is shown a side view of rod 12 as taken along the lines 4—4 in FIG. 2. In FIG. 4, the flattened end 12a of rod 12 is clearly depicted. A better view of electronic flash shoe 28 and the associated knurled nut 29 is also shown. It should be understood of course that knurled screw 29 passes through an aperture in the flattened end 12a of rod 12 to engage electronic flash shoe 28. Again, the relationship of clamps 17 and 24 as well as knurled nuts 22 and 25 relative to threaded rod 38 is shown. A cross-sectional view of rod 11 is indicated to show the relationship of rods 11 and 12 and bracket 10. Thus, there is shown and described a bracket for supporting a camera and electronic flash units thereon. This bracket can be used or positioned for either vertical or horizontal photographs. The bracket permits a camera to be used with two flash units thereby providing a natural lighting effect which is of low contrast and ideal for maximum information and reproduction quality. Because of the close proximity of the flash units to the subject, enough light is available to use quality film such as Kodachrome 25 or 64 and Panatomic-X for black and white. Working aperture of F16 or F22 with these films is used at all magnifications from 1/5th to twice life size. In a typical arrangement, rod 11 has a length of approximately 10¼ inches while rods 12 and 13 are approximately 8¼ inches long. The rods which can be fabricated of a lightweight anodized aluminum can be on the order of ½ inch (rod 11) and ⅜ inch (rods 12 and 13). While the shoe arrangements shown and illustrated are knurled nuts or knurled screws, it should be understood that easy grip Bakelite knobs or wing nuts can be utilized as well. The various clamps are precision milled clamps. Camera screw 21 can include a threaded aperture in the bottom portion thereof in order to permit ready assembly with a tripod apparatus.

While a description has been presented of a preferred embodiment, it should be understood that this description is intended to be illustrative only and is not intended to be limitative. In point of fact, those skilled in the art may conceive of modifications which can be made to the invention as described. However, any such modifications which fall within the purview of this description are intended to be included therein as well. The scope of this invention is not limited by the description but is limited only by the scope of the claims appended hereto.

Having thus described a preferred embodiment of the invention, what is claimed is:

1. The photographic equipment mounting bracket comprising;
   first, second and third rod members,
   first clamp means associated with said first and second rod members,
   second clamp means associated with said first and third rod members,
   said clamp means arranged to permit linear positioning adjustment along the respective rod members relative to each other and to permit angular positioning of said second and third rod members relative to said first rod member.

2. The bracket recited in claim 1, wherein;
   said clamp means include separate clamps associated with each of the respective rods and common threaded portions passing through said first and said second clamp means, respectively.

3. The bracket recited on claim 2 including;
   threaded means threaded onto each end of said common threaded portions for adjusting the tension applied to the respective rods by the respective clamp means.

4. The bracket recited in claim 3 including;
   means for mounting electronic apparatus at the ends of said second and third rod members, and
   means for mounting a photographic apparatus at said first rod member.

5. A photographic equipment support bracket comprising;
   first, second and third rod members having means for mounting photographic equipment thereon;
   a first clamp slidably engaging a first end of said first rod member and a second clamp slideably engaging a second end of said first rod member;
   a third clamp slideably engaging a first end of said second rod member and a fourth clamp slideably engaging a first end of said third rod member;
   a first threaded rod passing through said first clamp and said third clamp;
   first and third nuts threaded onto first and second ends of said first threaded rod for adjusting the tension of said first and third clamps onto said first rod member and said second rod member respectively; and
   second and fourth nuts threaded onto first and second ends of said second threaded rod for adjusting the tension of said second and fourth clamps onto said first rod member and said third rod member respectively.

6. The support bracket recited in claim 5, wherein;
   said first clamp and said third clamp have adjacent surfaces whereby the adjustment of said first nut or said third nut adjusts the tension between the adjacent surfaces of said first and third clamp for providing positioning of the angle between said first rod member and said second rod member, and
   said second clamp and said fourth clamp have adjacent surfaces whereby the adjustment of said second nut or said fourth nut adjusts the tension between the adjacent surfaces of said second and fourth clamps for providing positioning of the angle between said first rod member and said third rod member.

7. The support bracket recited in claim 6, including;
   means for mounting electronic flash apparatus at the ends of said second and third rod members, means for mounting a photographic apparatus at said first rod member, and wherein the adjustment of the tension applied to said first, second and third rod members by said first and second clamps, said third clamp, and said fourth clamp, respectively, provides adjustment of the linear position respectively of said clamps onto said rod members.

* * * * *